(12) United States Patent
Jarman et al.

(10) Patent No.: US 6,366,870 B2
(45) Date of Patent: Apr. 2, 2002

(54) IDENTIFICATION OF FEATURES IN INDEXED DATA AND EQUIPMENT THEREFORE

(75) Inventors: Kristin H. Jarman; Don Simone Daly; Kevin K. Anderson; Karen L. Wahl, all of Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/765,872

(22) Filed: Jan. 19, 2001

Related U.S. Application Data

(63) Continuation-in-part of application No. 09/288,758, filed on Apr. 7, 1999, now Pat. No. 6,253,162.

(51) Int. Cl.[7] .............................................. H01J 49/00
(52) U.S. Cl. ...................... 702/179; 702/69; 250/282; 340/541
(58) Field of Search ................... 702/69, 179; 382/254, 382/270, 275; 340/506, 511, 541; 250/282

(56) References Cited

U.S. PATENT DOCUMENTS

| 4,740,903 A | 4/1988 | Nakatsuka et al. ........... 702/32 |
| 5,440,119 A | 8/1995 | Labowsky .................. 250/282 |
| 5,774,378 A | 6/1998 | Yang ........................ 702/102 |

OTHER PUBLICATIONS

Bryant, W., et al., Data–Blocking Cross–Correlation Peak Detection in Computerized Gas Chromatography–Mass Spectrometry, Anal. Chem. 52, pp. 38–43 (1980).

Malmquist, G. and Danielsson, R., Alignment of Chromatographic Profiles for Principal Component Analysis: A Prerequisite for Fingerprinting Methods, J. of Chromatography 687, pp. 71–88 (1994).

Schodel, H., Utilization of Fuzzy Techniques in Intelligent Sensors, Fuzzy Sets and Systems 63, pp. 271–292 (1994).

Wittenbrink, C. M., et al., Glyphs for Visualizing Uncertainty in Vector Fields, IEEE Transactions on Visualization and Computer Graphics, 2:3, pp. 266–278 (1996).

*Primary Examiner*—Kamini Shah
(74) *Attorney, Agent, or Firm*—Woodard, Emhardt, Naughton, Moriarty & McNett Patent and Trademark Attorneys

(57) ABSTRACT

Embodiments of the present invention provide methods of identifying a feature in an indexed dataset. Such embodiments encompass selecting an initial subset of indices, the initial subset of indices being encompassed by an initial window-of-interest and comprising at least one beginning index and at least one ending index; computing an intensity weighted measure of dispersion for the subset of indices using a subset of responses corresponding to the subset of indices; and comparing the intensity weighted measure of dispersion to a dispersion critical value determined from an expected value of the intensity weighted measure of dispersion under a null hypothesis of no transient feature present. Embodiments of the present invention also encompass equipment configured to perform the methods of the present invention.

26 Claims, 7 Drawing Sheets

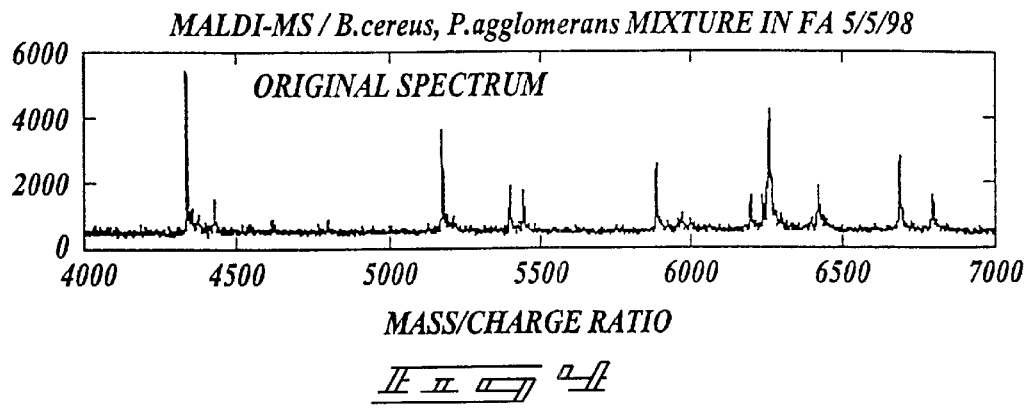
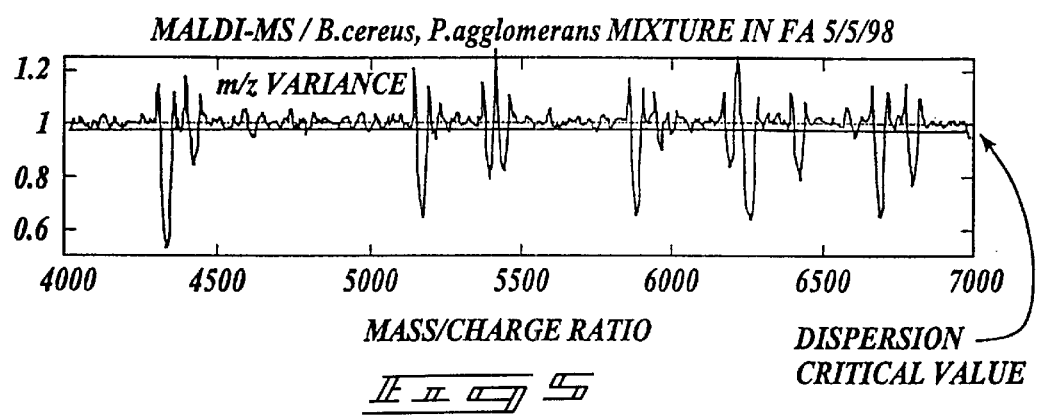
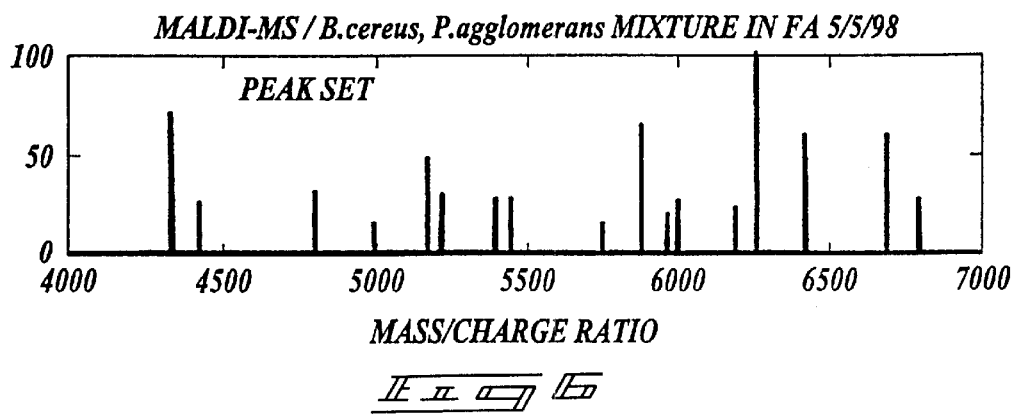

IDENTIFICATION OF FEATURES IN INDEXED DATA AND EQUIPMENT THEREFORE

CROSS REFERENCE TO RELATED APPLICATION

This is a Continuation-In-Part of U.S. patent application Ser. No. 09/288,758 filed Apr. 7, 1999, now U.S. Pat. No. 6,253,162 B1 and titled "Method of Identifying Features in Indexed Data."

This invention was made with Government support under Contract DE-AC0676RLO1830 awarded by the U.S. Department of Energy. The Government has certain rights in the invention.

FIELD OF THE INVENTION

Embodiments of the present invention relate generally to analyzing indexed data and more specifically to methods, and devices for performing such methods, of identifying and/or characterizing features in indexed data, for example spectral data.

BACKGROUND OF THE INVENTION

As used herein, the term "indexed dataset" or "spectrum" refers to a collection of measured values called responses where each response is related to one or more of its neighbor element(s). The relationship between the one or more neighbor elements may be, for example, categorical, spatial or temporal. In addition, the relationship may be explicitly stated or implicitly understood from knowing the type of response data and/or how such data were obtained. When a unique index, either one dimensional or multi-dimensional, is assigned to each response, the data are considered indexed. One dimensional indexed data is be defined as data in ordered pairs (index value, response). The index values represent values of a physical parameter such as time, distance, frequency, or category; the responses can include but are not limited to signal intensity, particle or item counts, or concentration measurements. A multi-dimensional indexed dataset or spectrum is also ordered data, but with each response indexed to a value for each dimension of a multi-dimensional array. Thus a two-dimensional matrix has a unique row and column address for each response (index value$_1$, index value$_2$, response).

The identification and/or characterization of significant or useful features in the analysis of indexed data is a classic problem. Often this problem is reduced to separating the desired signal from undesired noise by, for example, identifying peaks that may be of interest. For indexed data, each of such peaks appears as a deviation, that is to say a rise and a fall, in the responses over consecutive indices. However, background noise can also result in such deviations of responses leading, for example, to false peaks being included in indexed data.

Traditionally, peak detection has been based upon identifying responses above a threshold value. Whether this peak detection has been performed manually or by use of an automated tool, threshold selection has been a critical feature that has resisted an objective solution. Thus such previously known methods for threshold selection typically require arbitrary and subjective operator/analyst-dependent decision-making and are therefore an art. The effectiveness of such artful decision making, and as a result peak detection, using these known traditional methods is also affected by signal to noise ratio, signal drift, and variations in the baseline signal. Consequently, the operator/analyst has often had to apply several thresholds to the responses over different regions of indices to capture as much signal as possible. This has been shown to be difficult to reproduce, suffer from substantial signal loss, and subject to operator/analyst uncertainty.

An example of the problems with traditional peak detection and characterization algorithms and methods is illustrated by the development of statistical analysis methods for MALDI-MS (matrix-assisted laser desorption/ionization—mass spectrometry). The MALDI-MS process begins with an analyte of interest placed on a sample plate and mixed with a matrix. The matrix is a compound selected to absorb specific wavelengths of light that are emitted by a selected laser. Light from such laser is then directed at the analyte mixture causing the matrix material, selected to absorb the light energy, to become ionized. This ionization of the matrix material, in turn ionizes some molecules of the analyte which become analyte ions 100 (FIG. 1). A charge is applied at a detector 104 to attract analyte ions 100 through a flight tube 102 and ultimately to detector 104 where detector 104 measures a mass and ionic charge of each ion 100 that arrives over a time interval. This number, or abundance of ions over time, is converted using mass and charge data to an abundance of ions as a function of a mass/charge (m/z) ratio. Since ions 100 arrive at detector 104 in a disperse packet which spans multiple sampling intervals, ions 100 are binned and counted over several m/z units as illustrated in FIG. 2. Currently used algorithms require an operator/analyst to specify a detection threshold 200 for the intensities observed so that only peaks 202 that exceed this specified threshold will be detected and characterized. This procedure for setting the detection threshold appears conceptually appealing and suggests that m/z values for which no ions are present will read baseline relative abundance, while m/z values for which ions are present will result in a peak. However, as a result of this procedure peaks 202 detected for a specific analyte are not only dependent on the MALDI-MS instrument used but also on the skill of the operator/analyst in setting the detection threshold 200 used for the analysis. If such a user-defined threshold 200 is too low, noise can erroneously be characterized as a peak, whereas if threshold 200 is too high, small peaks might be erroneously identified as noise. Thus the manual setting of detection threshold 200 induces variability that makes accurate statistical characterization of MALDI-MS spectra difficult, such variability decreasing even further the effectiveness of current peak detection algorithms. Also related to the problem of distinguishing signals from noise is the bounding uncertainty of the signal. It is well known that replicate analyses of a sample often produce slightly different indexed data due to instrument variability and other factors not tied to an operator/analyst.

Thus, it would be advantageous, in the art of indexed data collection and analysis, for there to be methods of processing indexed data that provide greater confidence in identification/characterization of feature(s). In addition, it would be advantageous if such methods also provided for greater confidence in separating actual signals from noise with less signal loss, and that such methods are robust and minimize adverse effects of low signal to noise ratio, signal drift, varying baseline signal, boundary uncertainties and combinations thereof. In addition, it would be advantageous for such methods to be applicable to multi-dimensional arrays as well as for characterizing multi-dimensional uncertainty of signals. Finally, it would be advantageous for such methods to provide some or all of the aforementioned advantages while providing greater automation than currently available.

SUMMARY

Methods for identifying features in an indexed dataset or spectrum are provided. Whereas prior methods focused on comparing responses such as signal intensities to a response or signal intensity threshold, embodiments in accordance with the present invention combine such responses with indices, for example, mass charge (m/z) ratio values. More specifically, embodiments of the present invention considers such signal intensities, or any other measured response, as a histogram of indices, and uses this histogram concept to construct a measure of dispersion of indices. The responses associated with each of the indices are used as histogram frequencies in measuring the dispersion of indices. Comparison of the index dispersion, e.g. an intensity weighted variance (IWV), to a dispersion critical value or critical threshold provides for the identification or determination of significant or useful feature(s). Thus, some methods of the present invention encompass, but are not limited to:

(a) selecting a subset of indices, the subset being encompassed by a window-of-interest, the subset having at least one beginning index and at least one ending index that are usable for computing a measure of dispersion;

(b) computing a measure of dispersion for the subset of indices using a subset of responses corresponding to the subset of indices; and (c) comparing the measure of dispersion to a dispersion critical value.

In addition, some methods in accordance with the present invention encompass, but are not limited to:

(a) selecting a subset of indices, the subset being encompassed by a window-of-interest, the subset having at least one beginning index and an at least one ending index that are usable for computing an intensity weighted variance (IWV);

(b) computing the intensity weighted variance (IWV) for the subset of indices using a subset of responses corresponding to the subset of indices;

(c) computing an intensity weighted covariance (IWCV) for the subset of indices using a subset of responses corresponding to the subset of indices; and (d) comparing the IWV to a critical value determined from the statistical properties of the IWV.

(e) comparing the IWCV to a critical value determined from the statistical properties of the IWCV.

For MALDI-MS, index values are generally m/z ratios and the responses, corresponding intensities. Each index value represents a specific m/z ratio, and its corresponding intensity measurement represents the relative abundance of ions having that specific m/z ratio. Thus a MALDI-MS spectrum can be thought of as a histogram of m/z ratios that depicts the relative abundance of each m/z ratio measured.

From this histogram concept, features in the spectrum can be identified and characterized by comparing some of the properties of a histogram for any window-of-interest, to the corresponding properties for a hypothesized noise only distribution. In some embodiments of this invention, this noise only distribution is used as a criteria for distinguishing spectral features or peaks that are due to an actual signal, from those spectral features that are due to noise. In particular, when no transient feature or actual signal is present in a first window-of-interest, the neighborhood intensity is relatively constant.

In one-dimensional applications, a histogram created from the data collected from within the first widow-of-interest will essentially be a one-dimensional (1-D) discrete uniform distribution, which is understood to be a histogram where the intensity of any bin is approximately the same for all bins. On the other hand, where an actual signal or transient feature is present within a second window-of-interest, the distribution of intensities across the window will be unequal and a histogram created from the data of that second window will show at least one bin with an intensity unequal to the other bins. Thus the difference between the distribution of intensities or signals from one window-of-interest to another are advantageously employed to detect the presence of an actual signal or peak within a spectrum or indexed dataset. As mentioned above, for MALDI-MS, index values or bins are generally m/z ratios and the responses are generally the corresponding intensities. However other index values and responses can be used to form an indexed dataset or spectrum. For example, some spectra that can be evaluated by embodiments in accordance with the present invention that encompass an index value which is a physical displacement from a point of origin and a response which represents an intensity at that displacement. In addition, embodiments of the present invention can also be employed to evaluate a multi-dimensional spectrum or multi-indexed dataset. Thus, as will be discussed, some embodiments are advantageously used to detect and/or characterize transient features from datasets that incorporate a first index value, a second index value and a response.

Advantages of embodiments of the present invention include minimizing the effects of signal to noise ratio, signal drift, varying baseline signal and combinations thereof. In addition, such embodiments of the present invention provide for the automation of transient feature detection and data reduction by minimizing or eliminating the need for user selection of a threshold and by automatic, iterative scans of the data using windows of interest of varying sizes where a first window size is selected based on the resolution of the instrument providing the data.

Other embodiments in accordance with the present invention encompass equipment that is configured to perform the methods described herein. Thus such embodiments include a general purpose computer apparatus having program code effective to perform the methods of the present invention. Still other embodiments of the present invention encompass analytical instruments configured to both collect and analyze data.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4 depicts a MALDI-MS spectrum of a mixture of microorganisms according to Example 1.

FIG. 5 depicts a measure of dispersion and a dispersion critical value for the spectrum of FIG. 4.

FIG. 6 depicts a graph of transient features identified employing an embodiment in accordance with the present invention.

FIG. 7a depicts transient features, from a first MALDI-MS run on a bacteriological sample, identified employing an embodiment in accordance with the present invention.

FIG. 7b depicts transient features, from a second MALDI-MS run on the same bacteriological sample as used for FIG. 7a, identified employing an embodiment in accordance with the present invention.

FIG. 7c depicts transient features, from a third MALDI-MS run on the same bacteriological sample as used for FIG. 7a, identified employing an embodiment in accordance with the present invention.

DETAILED DESCRIPTION

Figure 1:
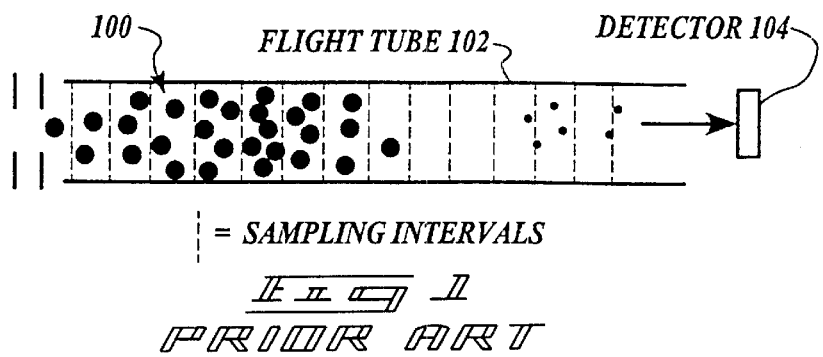
FIG. 1 is exemplary of time-of-flight mass spectrometry according to the Prior Art, depicting particles of different masses being separated while traveling through a flight tube, the particles having different velocities, such particles of a given mass are binned as according to the sampling interval of the detector.
Figure 2:
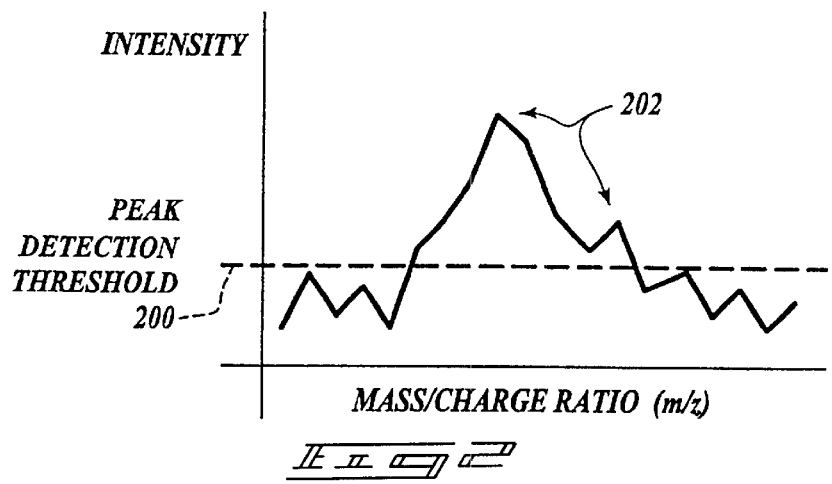
FIG. 2 is exemplary of a MALDI-MS spectrum using a Prior Art method of determining a peak detection threshold.
Figure 3:
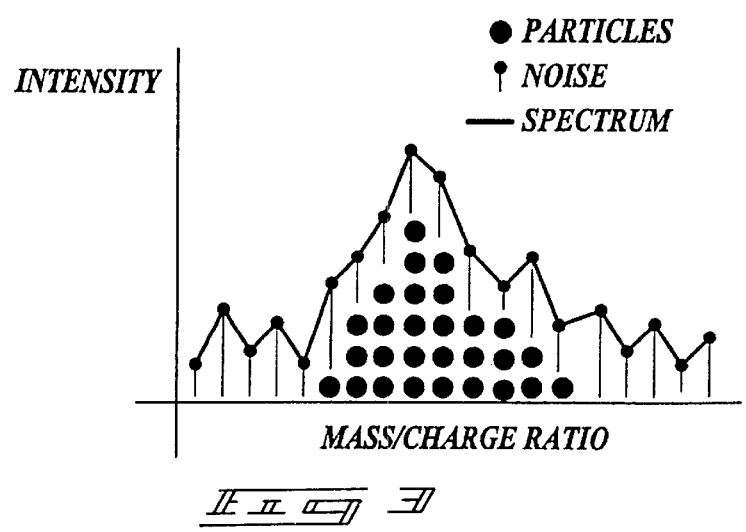
FIG. 3 is illustrative of the concept of a spectrum as a histogram, or sequence of bins containing measuring particle counts augmented by measurement uncertainty, in accordance with embodiments of the present invention.
Figure 2A:
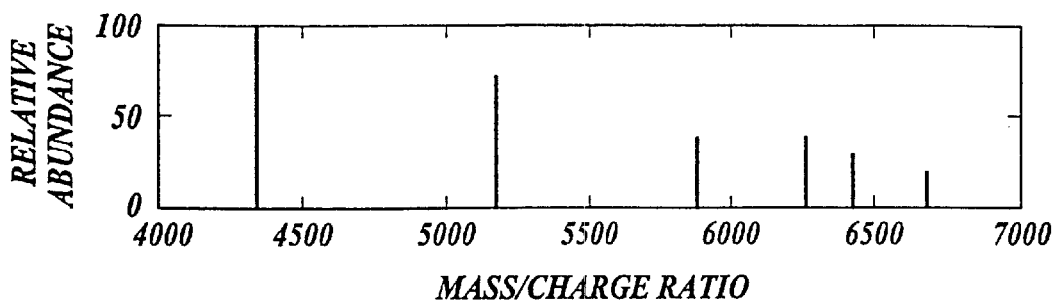
Figure 2B:
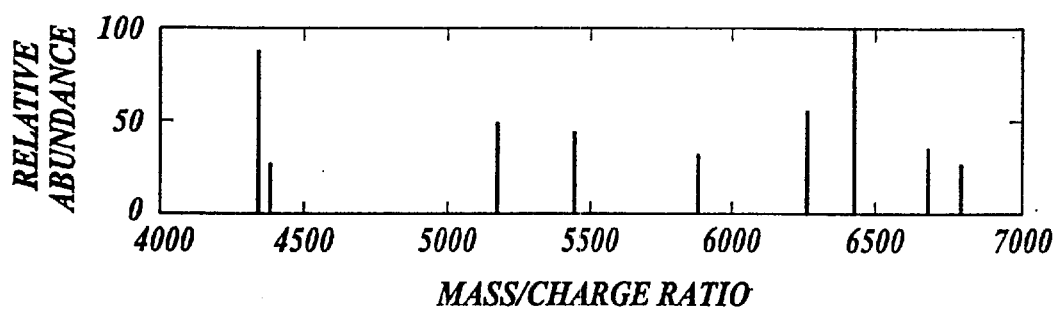
Figure 2C:
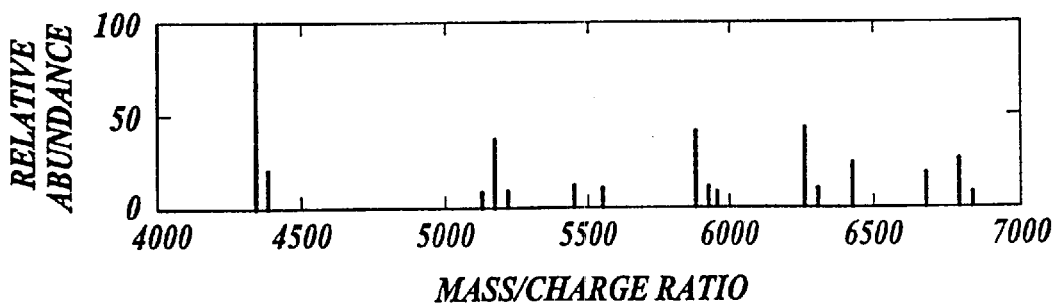

The present invention encompasses methods of identifying features in indexed data as well as equipment configured to perform such methods. Such indexed data may be provided as spectral data obtained from processes including but not limited to mass spectrometry (MS); gas chromatography (GC); nuclear magnetic resonance (NMR), Auger, and/or infrared and RAMAN spectroscopy. The present invention also encompasses other forms of data including, but not limited to numerical transforms of data such as Fourier and wavelet transforms; time series data such as financial stock or bond market time series; acoustic transducer or other sensor output; and automobile traffic monitoring or other counting processes.

Where the term "index" is used herein, it will be understood to encompass one or more physical parameters including but not limited to time, distance, frequency, location, an identifier parameter (for example demographic data), index number and combinations thereof. The term "indexed data" is understood to include, but is not limited to, sets of ordered data which can be expressed as ordered pairs (index, response), or as ordered multiples ($index_1$, $index_2$, . . . response) from multi-dimensional analyses. Such data is derived from analyses including, but not limited to, two dimensional (2-D) mass spectrometry (MS-MS), 2-D gas chromatography (GC-GC), 2-D Fourier transforms, 2-D bio-chip micro-arrays, 2-D gels, 3-D nuclear magnetic resonance microscopy and combinations thereof.

One useful application of embodiments in accordance with the present invention is the determination or identification/characterization of spectral peaks within the indexed dataset or spectrum. For such embodiments, peaks or actual signals are extracted from background noise in a fully automated, objective manner. Thus the number of such peaks that may be missed due to a relatively small signal intensity or any of the other aforementioned, previously known problems is consistent from one data collection to the next and can therefore be quantified.

In some embodiments in accordance with the present invention, peaks are extracted by calculating a measure of index dispersion at each index value using a moving window method. That is, for each index value in turn, a measure of index dispersion is calculated using a contiguous subset or window of neighboring indices and their corresponding responses. In some embodiments of this invention, a measure of index dispersion is calculated for a window centered on each index value. However, it is also within the scope of this invention that a measure of index dispersion be calculated for fewer index values. For example, in some embodiments only every third or fifth index value is employed. While generally it is advantageous that the window be of a size of the signal peak, such size may vary depending on, for example, the properties of the features of interest.

The term "measure of dispersion" is understood herein to encompass a moment estimate which includes, but is not limited to, estimates of variance, covariance, mean squared error, skewness, kurtosis, absolute deviation, trimmed or weighted moments, and combinations thereof.

One-Dimensional Applications

For one-dimensional applications, the following notation is employed.

$X_k, I_k$ denotes the index value and response, respectively, at index k.

$\mu, \sigma^2$ represent the mean and variance, respectively, of the response at index k.

$\Delta x$ denotes the bin width, or change in index value from one point to the next.

N refers to the number of index values inside a window of interest.

x (overline) refers to the average index value in some window of interest and corresponds to the center index value in the window.

$s_U$ denotes the theoretical IWV for a uniform distribution inside some window of interest.

In some embodiments, spectral peaks are recognized or identified by such measures of dispersion. That is to say employing dispersion values that are above or below (depending upon the reference datum and the measure of dispersion chosen) a dispersion critical value. Thus, noise is separated from an actual signal since the noise has a dispersion that is above the dispersion critical value. In operation with hundreds to thousands of data points, a peak is advantageously identified using a ratio of indexed dispersion measures to an expected dispersion measure for a uniform distribution. More specifically, a peak is determined to be where consecutive ratios fall below the dispersion critical value, that is a plurality of weighted measures below the dispersion critical value. Embodiments in accordance with the present invention select the dispersion critical value using a variety of methods. Such methods will be understood to include, but not limited to, a priori selection by the user as a constant for all datasets, or statistical techniques based on characterizing the dispersion distribution and constructing a critical value for whether or not a peak is present.

Thus in some embodiments of the present invention, a dispersion critical value or critical threshold is determined using the noise levels of the dataset and the variation of the dispersion measure over windows where no peaks are present. In particular, the critical value is determined for each dataset in an automated fashion by first characterizing the variation in dispersion, denoted $S_D$, using a robust estimate of the variance of dispersion measures across all windows. Such robust estimation is used so that the estimated variance of the dispersion will not be influenced by transient features. To detect a peak, the dispersion critical value is determined to be $1-ks_D$, where k is a positive number, usually 2.5 or 3. Consecutive ratios of index dispersion to dispersion for a uniform distribution that fall below $1-ks_D$, are determined as containing a peak. This approach is insensitive to signal to noise ratio, signal drift, varying baseline signal and combinations thereof.

In some embodiments in accordance with the present invention, spectral peaks are recognized or identified by determining a critical threshold value using methods that evaluate the intensity weighted variance (IWV) over the indexed data or spectrum (a number of windows-of-interest). In such embodiments, IWV is defined by Equation 1 as:

$$IWV = \frac{\sum_{j \leq N} I_j(x_j - \bar{x})^2}{\sum_{j \leq N} I_j} \quad (1)$$

To specify a critical threshold value, IWV is scaled by the variance of a discrete uniform distribution $S_u^2$ and tested using an exemplary null hypothesis:

$$H^0: IWV/s_U^2 = 1.$$

where $$s_U^2 = \frac{h^2(N^2 - 1)}{12} \quad (2)$$

In a given window, the null hypothesis is rejected if the test statistic computed from scaling Equation 1 by $S_U^2$ falls below the critical value for the desired significance level of the test.

Under $H_0$, the cumulative probability distribution of IWV can be derived using Equation 3:

$$P\{IWV/s_U^2 \leq t\} = P\left\{ \frac{\sum_{j \leq N} I_j(x_j - \bar{x})^2}{\sum_{j \leq N} I_j} \leq s_U^2 t \right\} \quad (3)$$

$$= P\left\{ \sum_{j \leq N} I_j(x_j - \bar{x})^2 \leq s_U^2 t \sum_{j \leq N} I_j \right\}$$

$$= P\left\{ \sum_{j \leq N} I_j[(x_j - \bar{x})^2 - s_U^2 t] \leq 0 \right\}$$

if the distribution of the intensity values $I_j$ is known, the distribution of IWV is found either analytically or numerically. For example by assuming, under $H_0$, that $I_j$; j=1,2, . . . N are independent and identically distributed (i.i.d.), normal random variables with mean $\mu$ and variance $\sigma^2$.

Such an assumption results in Equation 4:

$$\Sigma_{j \leq N} I_j[(x_j-\bar{x})^2-s_U^2 t]/s_U^2 \sim N(\mu\Sigma_{j \leq N}[(x_j-\bar{x})^2-s_U^2 t]/s_U^2, \sigma^2 \Sigma_{j \leq N}[(x_j-\bar{x})^2-s_U^2 t]^2/s_U^4) \quad (4)$$

where N (x,y) refers to the univariate normal distribution with mean x and variance y. The mean and variance in Equation 4 can be simplified by taking:

$$\Sigma_{j \leq N}[(x_j-\bar{x})^2 - s_U^2 t]/s_U^2 = N(1-t)$$

and $$\sum_{j \leq N} [(x_j - \bar{x})^2 - s_U^2 t]^2 / s_U^4 = N\left( \frac{3}{5} \times \frac{3N^2 - 7}{N^2 - 1} - 2t + t^2 \right)$$

In this manner, Equation 4 becomes:

$$\sum_{j \leq N} I_j[(x_j - \bar{x})^2 - s_U^2 t]/s_U^2 \sim \quad (5)$$

$$N\left( \mu N(1-t), \sigma^2 N\left( \frac{3}{5} \times \frac{3N^2 - 7}{N^2 - 1} - 2t + t^2 \right) \right).$$

The distribution of IWV is computed directly from Equation 5 and the standard normal c.d.f. Finally, a critical threshold value for rejecting the null hypothesis $H_0$ is computed by setting a desired significance level for the test (usually 0.05 or 0.01) and solving Equation 6 for $T_c$.

$$P\{IWV \leq T_c \mid H_0\} = \alpha \quad (6)$$

$$= \Phi\left\{ -\frac{\mu}{\sigma} \frac{N(1-T_c)}{\sqrt{N\left[\frac{3(3N^2-7)}{5(N^2-1)} - 2T_c + T_c^2\right]}} \right\}$$

where $\Phi$ represents the standard normal probability distribution function. This approach is insensitive to signal to noise ratio, signal drift, varying baseline signal and combinations thereof.

Two-Dimensional Applications

The notation for two-dimensional applications employed here is as follows:

$X_k$, $y_j$, $I_{kj}$ denotes the index values and response, respectively, at index k, j.

$\mu$, $\sigma^2$ represent the mean and variance, respectively, of the response at index k, j.

$\Delta x$, $\Delta y$ denote the bin width, or change in index value x and y, respectively, from one point to the next.

$N_x$, $N_y$ refer to the number of x and y index values, respectively, inside a window of interest.

x (overline), y (overline) refer to the average x and y index value, respectively, in some window of interest and corresponds to the center index values in the window.

$S_x$, $S_y$ denote the theoretical IWV for a one-dimensional uniform distribution across index x and y, respectively, inside some window of interest.

Embodiments in accordance with the present invention are useful for identifying and/or characterizing peaks from data supplied from a variety of applications that provide two dimensional data. Once such exemplary application is digital photography, for example, using a charge-coupled (CCD) array. Digital photography begins with light, as photons, reflecting or emanating from the subject or scene. The model for digital photography begins with these photons and relies upon the statistical concept of a two-dimensional histogram. While there are various ways in which such a 2-D histogram can be formed, for clarity and ease of understanding, the description hereinafter is provided in terms of a digital camera based on simple charge-coupled array that is used to form an image of the scene from the reflected light. It will be understood, however, that the embodiments of the present invention are not limited to digital photography and apply to any other form of instrumentation that produces dual-indexed data.

In a first step, the camera's aperture is opened for a fixed time period to expose a charge-coupled array to photons emanating from the photographed scene. Since each of these photons impinges on only one cell within the array, each photon strike is directly related to a location in the scene and directly related to a pixel in a corresponding digital image of the scene. Thus each cell of the charge-coupled array is a spatially-defined bin within which photon strikes are detected and counted over the exposure period. The charge-coupled array converts each photon strike into an electronic charge. Thus, each cell accumulates, over the exposure period, a total charge from the photons that fall upon it. This charge is then transferred, converted into a voltage, the voltage amplified, as required, and then digitized. As known, each of such digitized voltages will also include any of the noise introduced by the above described process.

It will be understood then that the method described for quantifying the digitized voltage for each cell, results in a value that is proportional to the number of photons received at that cell. In addition, the collection of digitized voltages of all the cells in the charged-coupled array is a two-dimensional spectrum or indexed dataset I(x,y). That is to say a spectrum of digitized intensities I, one for each cell coordinate (x,y) of the charge-coupled array. If the array is converted to a digital image of the photographed scene, each set of cell coordinates (x,y) correspond to a set of pixel coordinates for the digital image. Consequently, a charge coupled array produces an image-like observation that is a 2-D histogram of scene locations that emitted photons. Such a model is readily extended to any other image-like observation where the measurements can be described as a spatially-indexed set of intensities.

Determination of a critical threshold value for use in transient feature detection is performed in a manner analogous to that described above. Thus for a 2-D window-of-interest within the 2-D spectrum, where there is not a transient feature present, the measured intensities within the window are relatively constant and vary only because of noise. Such intensities resemble a 2-D histogram having a 2-D discrete uniform distribution; where the relative intensity measured is roughly the same for all locations within the window. For a window-of-interest where there is a transient feature present in the window, the intensities are not roughly the same for all pixels; and the distribution of intensities does not resembles a 2-D histogram of 2-D discrete uniform distribution. In particular, if the transient feature is a bright spot centered in the window, the intensities across the width of that bright spot, or relative photon counts, are relatively higher at the center of the window as compared to the intensities, or relative photon counts, at the edges.

Within this window, the photon locations under an uncorrelated 2-D uniform distribution (i.e., no transient feature present) will be randomly distributed about the window. In this case, the sample covariance of the photon locations weighted by the pixel intensities, the intensity-weighted covariance IWCV, will be consistent with the spherical covariance of an uncorrelated 2-D discrete uniform distribution. When a transient feature is present, the sample covariance will no longer be uncorrelated (spherical) nor consistent with a 2-D discrete uniform distribution. With this in mind, a transient-feature detection method can be devised based on the comparison of the intensity-weighted sample covariance of the photon locations to the hypothesized spherical covariance of an uncorrelated 2-D discrete uniform distribution expected when no transient feature is present. In particular, the sample covariance matrix IWCV, in one arrangement, is defined by Equation 7:

$$IWCV(\text{window}) = \frac{1}{\sum_i \sum_j I_{ij}} \begin{pmatrix} \sum_i \sum_j I_{ij}(x_i - \bar{x})^2 & \sum_i \sum_j I_{ij}(x_i - \bar{x})(y_j - \bar{y}) \\ \sum_i \sum_j I_{ij}(x_i - \bar{x})(y_j - \bar{y}) & \sum_i \sum_j I_{ij}(y_j - \bar{y})^2 \end{pmatrix} \quad (7)$$

Where the summations are over the indices in the window and the means $\bar{x}$ and $\bar{y}$ are the averages of the x and y values in the window, respectively.

The expected value of IWCV under the hypothesis of no transient feature present is represented, for such embodiments, by Equation 8:

$$E[IWCV(\text{window})] \approx \begin{pmatrix} S_x^2 & 0 \\ 0 & S_y^2 \end{pmatrix} \quad (8)$$

$$= \begin{pmatrix} \Delta x^2(N_x^2 - 1)/12 & 0 \\ 0 & \Delta y^2(N_y^2 - 1)/12 \end{pmatrix}$$

Here, the number of pixels in the window are ($N_x$*$N_y$) pixels.

Posed as a statistical hypothesis test, we wish to test the null hypothesis $$H_0: IWCV_{(window)} = E[IWCV_{(window)}].$$

As known from multivariate normal theory, the likelihood ratio statistic Λ for testing the null hypothesis is the ratio of the determinants of the sample covariance matrix and the hypothesized covariance matrix. Thus the test is based on the ratio expressed by Equation 9:

$$\Lambda = \text{determinant}(IWCV)/\text{determinant}(E[IWCV]) \quad (9)$$

As before, the null hypothesis is rejected if the test statistic is less than the critical value, for example the critical value determined from the IWV and, accepted if it is more than such value.

Where a distribution of the intensity values $I_{ij}$ is known, the distribution of Λ is evaluated. Where the intensities of the spectrum are independent and identically distributed Normal random variables with a mean $\mu$ and a variance $\sigma^2$, Λ is approximately distributed as a Normal random variable:

$$\Lambda \sim N\left(1, \frac{\sigma^2}{\mu^2 N_x N_y}(C_x + C_y - 2)\right),$$

where $$C_x = \frac{3}{5} \times \frac{(3N_x^2 - 7)}{(N_x^2 - 1)} \text{ and } C_y = \frac{3}{5} \times \frac{(3N_y^2 - 7)}{(N_y^2 - 1)}.$$

follows from a standard propagation of errors. Where the desired significance level is 95%, the critical threshold is given by Equation 10:

$$\Lambda_{critical} = 1 - 1.645 \frac{\sigma}{\mu\sqrt{N_x N_y}} \sqrt{C_x + C_y - 2} \quad (10)$$

and a transient feature is identified in a window-of-interest when $\Lambda < \Lambda_{critical}$.

It will be understood, that transient feature detection proceeds by selecting a size for any window-of-interest that is approximately the dimensions of the transient feature, and performing the hypothesis test described above for successive windows that span the entire spectrum. While it is found that transient feature detection performance is optimal when the window size selected is between 1.25 and 1.5 times the size of a typical transient feature, such optimal performance can be enhanced when the signal to noise ratio is low by performing several iterations through the spectrum with varying window sizes ranging from about the size of the smallest transient feature to the size of a broad transient feature. Generally it has been found advantageous in the analysis of data from such sources as MALD-MS, Raman and NMR spectroscopy to perform multiple iterations of the scanning, each iteration having a different window size. For example, where a first window of interest, at the beginning of the data, is selected to have a first width that is between 1.25 and 1.5 times the size of an expected typical transient feature, the entirety of the data is scanned employing that first window of interest. A second scan or iteration would then be preformed employing a second window of interest having a second width that determined by either dividing or multiplying the first width by a constant factor. It has been found advantageous to several iterations where there are a number of window sizes greater than the first window size and a number of window sizes smaller that the first window size. For example, scans of the data employing one, two or three both smaller and larger window sizes would result in three, five and seven iterations. For each scan of the data, an apparatus, such as a general purpose computer, is used to perform the calculations described hereinbelow to detect the presence of transient features. It will be understood that the selection of the first window size is generally a function of the measurement instruments resolution, thus a value representative of that resolution would generally be thought of as the expected typical transient feature size. Thus selection of this first size is objectively made. In other embodiments of the present invention, other methods are used to determine the size of the first window of interest. For example, in some embodiments in accordance with the present invention the first width is set at the width of a representative feature at half height of that feature.

As one skilled in the art will understand, the present invention is not limited to detection and characterization of features using a variance estimate IVW or a covariance estimate IWCV as given in Equations 1 and 7, respectively. In particular, robust measures of covariance may be used. In addition, other characteristics for features of interest may be used to detect features including but not limited to the centroid, and third or higher moments, or robust estimates of the same. The following Examples are helpful in illustrating embodiments in accordance with the present invention.

EXAMPLE 1

An experiment was conducted to demonstrate the utility of the present invention. FIG. 4 displays a raw MALDI mass spectrum for a mixture of *Bacillus. cereus* and *Pantoea agglomerans*. FIG. 5 displays the measure of index dispersion for all windows over the entire spectrum. The straight line at approximately 0.98 represents the dispersion critical threshold. Any plurality of measures of index dispersion that drop below this threshold represent an area where a peak, or transient feature is identified. Thus, FIG. 6 displays the transient features selected by this algorithm, where peak height was estimated as the area under the peak and peak location was estimated using the trimmed mean. Such estimates being determined using any of the well known methods for such a purpose.

Replicate Data Sets

Embodiments in accordance with the present invention are especially useful for analyzing at least two replicate data sets for a sample. From replicate data sets are obtained (1) an estimate of expected value of the response and (2) an estimate of expected value of the index. Uncertainty or variance of the data from the at least two replicates for both the index value and the measured response are also obtained. Displaying the estimate of expected value and the estimate of uncertainty together greatly facilitates the analyst's understanding of the replicate data and relationships therebetween.

In particular, a vertical bar of length corresponding to the expected value of the response is placed at each expected value of the index corresponding to the response. In addition, an uncertainty region centered at the top of each vertical bar represents the joint uncertainty in the estimated peak location and height. For each peak, the size and shape of the uncertainty region depends on the underlying stochastic nature of the spectra being visualized and the intended usage of the resulting plot. The display resembles a collection of irregularly-spaced and various sized lollipops standing on end along the horizontal axis of the display.

Some embodiments in accordance with the present invention use an average of the replicates, and uncertainty regions that enclose a majority of variation in the replicate spectra. More specifically, the uncertainty region for each spectral peak is may be constructed independently and may envelope up to 95% of the peak location and height derived from the standard deviation of the replicate peak heights and locations, and assuming normality. Therefore, by examining the size of the uncertainty regions, an analyst can visualize how much the replicates vary from one to the next, an important consideration in determining reproducibility.

It will be understood by those of skill in the art that different statistical estimates of uncertainty may be used. In particular, rather than visualizing the 95% variation region of peak heights and locations, confidence intervals may be used to visualize the accuracy of the estimated peak heights and locations. The uncertainty intervals may take peak height and location into account independently, or a joint uncertainty region incorporating both may be used. Statistical correlation between peak height and location may be incorporated into the uncertainty intervals. Finally, the uncertainty in the presence of the replicate peaks may be visualized by displaying, at the base of each peak, the fraction of replicates where the peak appeared.

EXAMPLE 2

Figure 8:
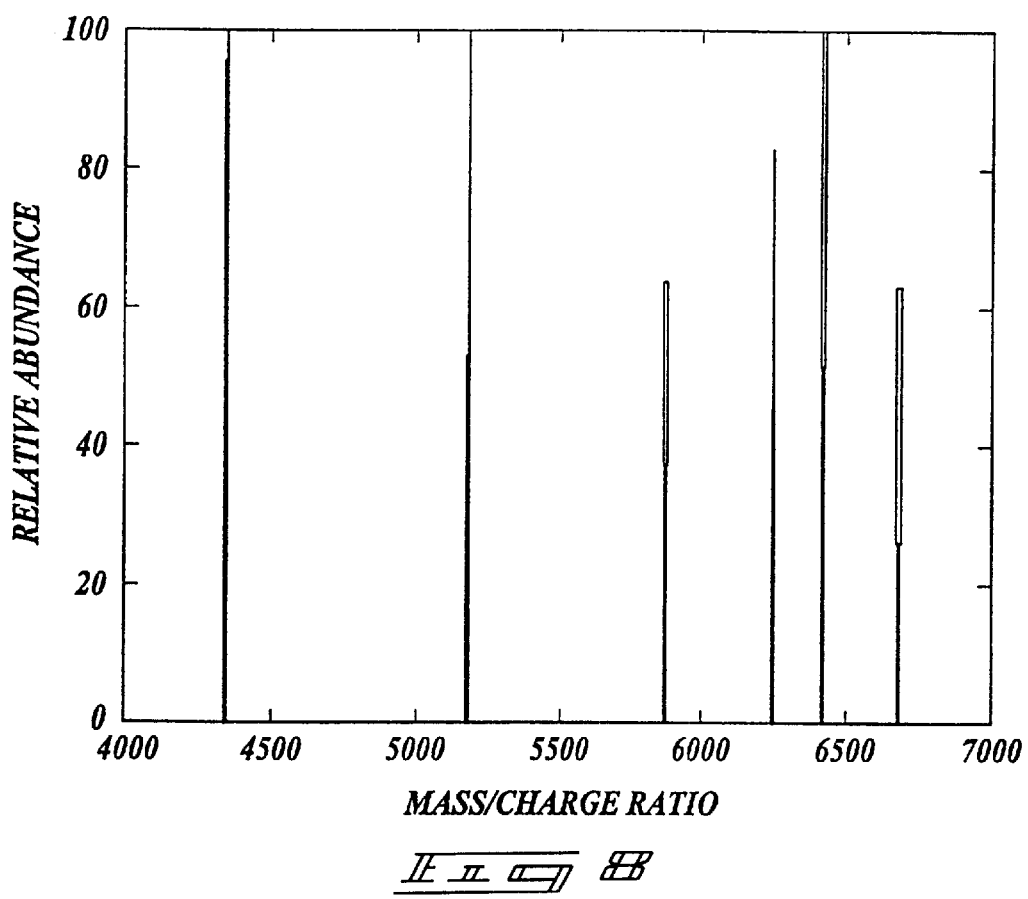
FIG. 8 depicts transient features as a composite average of the peaks from FIGS. 7a, 7b, and 7c together with uncertainty regions centered at the tops of the vertical bars, identified in accordance with embodiments of the present invention.

Peaks, or transient features, were identified in three replicate MALDI mass spectra of *Bacillus cereus* according to the procedure of Example 1 and are displayed in FIGS. 7a, 7b and 7c. The relative peak heights (responses) and locations (indices) for replicate peaks between 6000–7000 m/z units are averaged and plotted in FIG. 8. In addition, using the assumption that peaks heights and locations are independent and normally distributed, a 95% variation interval for peak height and location is estimated using a t-distribution and the standard deviation of each peak's relative height and location. The uncertainty region is then displayed as a rectangle centered a top of its respective peak estimate. The peak estimates of 95% of all replicates collected under similar conditions are expected to appear within the uncertainty region.

EXAMPLE 3

Referring now to FIGS. 9a through 13, the location and extent of five liquid droplets positioned on a glass slide are measured in a non-invasive manner using a charge coupled device (CCD) digital camera in a manner in accordance with embodiments of the present invention. It will be understood that these Figures of droplets are presented as being representative of any 2-D indexed dataset or spectrum that is generated by any appropriate instrument, as previously described, and thus does not limit the instant invention in any manner.

Figure 9A:
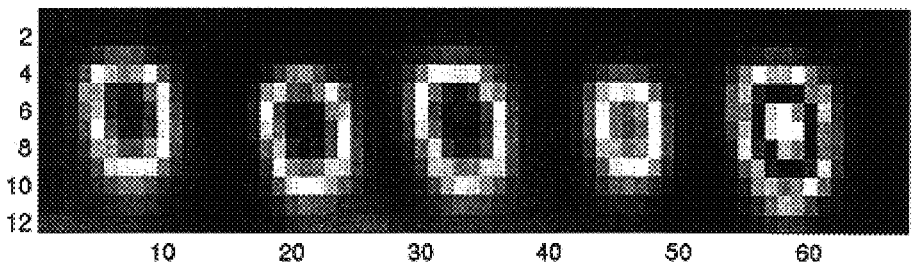
FIGS. 9a and 9b are 2-D plan and 3-D surface representations, respectively, of an intensity matrix generated from droplets of a liquid on a glass slide as described in Example 3.
Figure 9B:
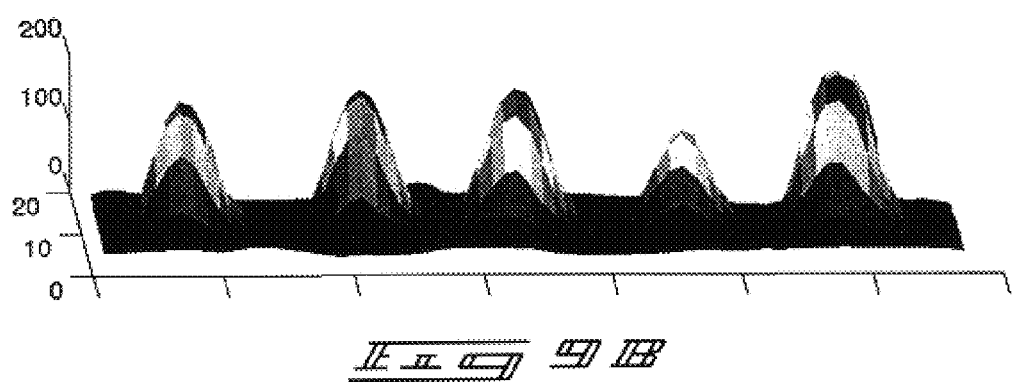
Figure 10A:
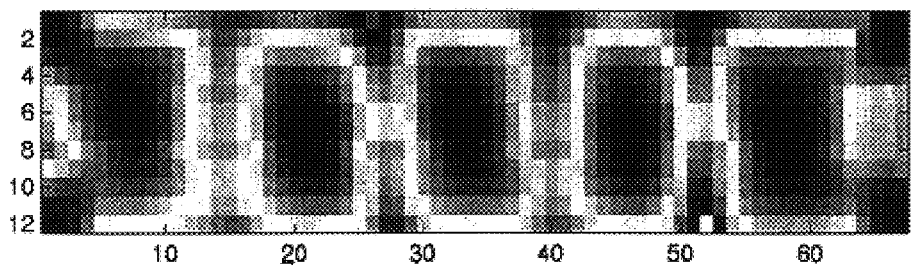
FIGS. 10a and 10b are 2-D plan and 3-D surface representations, respectively, of the transient detector test statistic matrix of the intensity matrix of FIGS. 9a and 9b, in accordance with embodiments of the present invention.
Figure 10B:
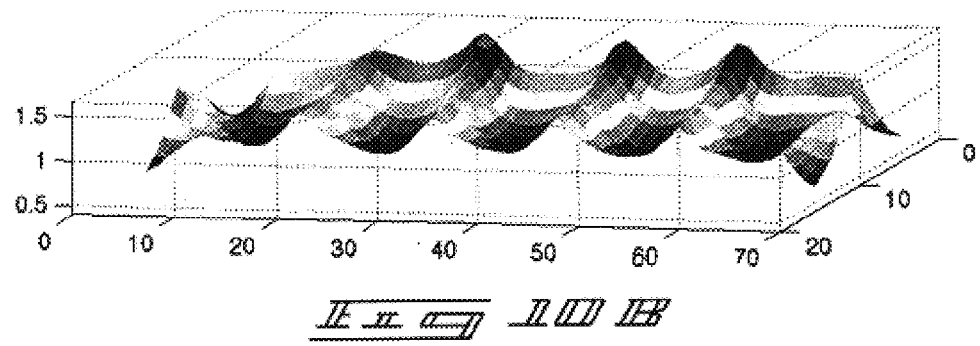

As depicted in FIGS. 9a and 9b, an intensity matrix or image of the droplets is depicted in both 2-D plan and 3-D surface representations. A CCD camera imaged the scene and produced an intensity data matrix, or a set of intensity values wherein each intensity I is indexed by both row r and column c positions: $\{I(r,c)\}$. Thus, each position, r,c, in the matrix corresponds directly to a cell in the CCD array and hence a location on the glass slide.

It has been found advantageous to consider each position, r,c, associated with a droplet, as constituting a neighborhood of such positions on the slide, and a corresponding neighborhood on the CCD array and in the intensity matrix. Thus in FIG. 9a, for example, it will be understood that more light (photons), is reflected from positions of each droplet on the glass slide than by positions of the slide itself that are not covered by a droplet. Hence, the spatial distribution of photons across the CCD array and the spatial distribution of intensities across the intensity matrix are larger in droplet neighborhoods than in any surrounding regions. In FIG. 9a, for example, the neighborhood of intensities corresponding to each droplet appears as bright spots in the image of the matrix whether viewed in a 2-D plan representation or a 3-D surface representation.

As it will be seen below, each droplet may be considered a transient feature, and the glass slide the background against which such transient features are detected. Hence, a portion of each corresponding neighborhood distribution of higher intensities in the matrix, the bright spots in for example FIG. 9a or each peak on the surface represented in FIG. 9b, are transient features.

Figure 11A:
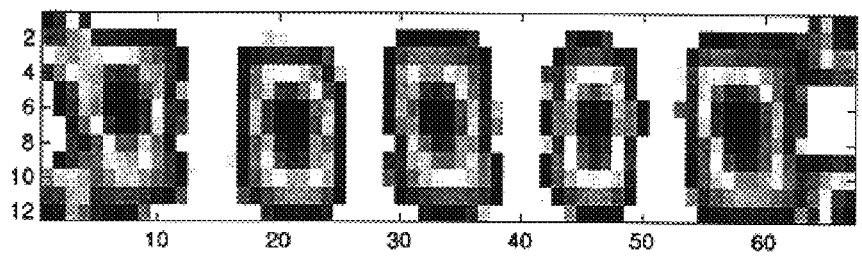
FIGS. 11a and 11b are 2-D plan and 3-D surface representations, respectively, of the transient detector test statistics, depicted in FIGS. 10a and 10b, that exceed the test critical value as determined in accordance with embodiments of the present invention.
Figure 11B:
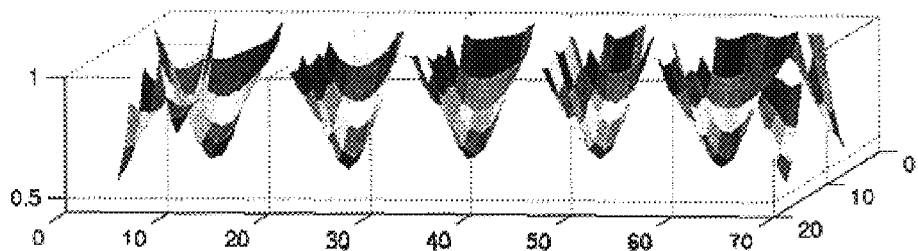

First, the transient detector test statistic (Equation 9) was calculated for each cell in the CCD matrix, or equivalently, each pixel in the image using an M×N moving window (in this example, a 9×9 pixel moving window). The resulting matrix of test statistics was visualized via the 2-D plan representation and 3-D surface representation depicted in FIGS. 10a and 10b. Next, each test statistic was compared to the critical value (Equation 10), determined in a manner previously described. Each position, r,c, whose test statistic was less than the critical value was determined to belong to the transient feature, in this case, a droplet neighborhood. FIGS. 11a and 11b show the test statistics that are less than the critical value with those exceeding the critical value set to that critical value.

Figure 12A:
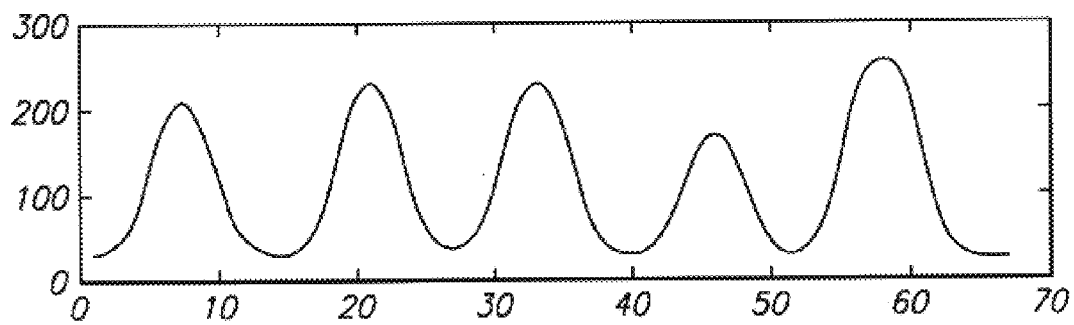
FIGS. 12a and 12b are representations of profiles across the 7th row of the intensity matrix and the test statistic matrix, respectively.
Figure 12B:
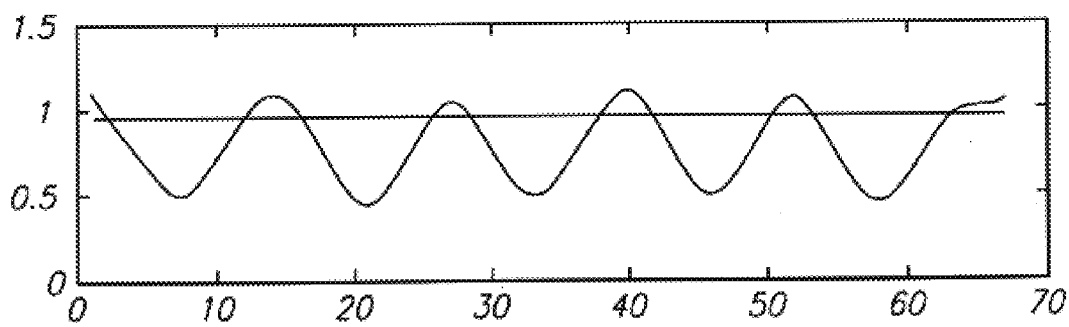
Figure 13:
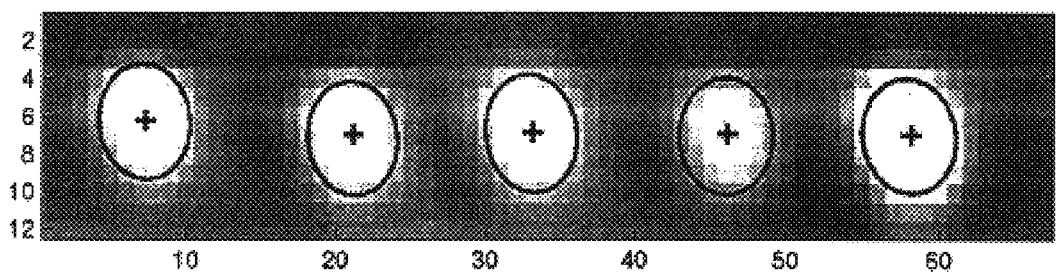
FIG. 13 is a representation of estimates of the locations and size of the droplets described in Example 2 as derived from the transient detection statistics in accordance with embodiments of the present invention.

Next, a transect of the two-dimensional transient feature detection test statistic (Equation 9) was extracted for comparison with the one-dimensional transient feature detection case. FIGS. 12a and 12b demonstrate the similarity between the one-dimensional and two-dimensional algorithms. Finally, estimates of the location and extent of the droplets on the glass slide were determined and denoted by the plus symbols and contour lines of FIG. 13.

It will be also understood that embodiments, such as the exemplary embodiment of Example 3, in accordance with the present invention, are especially useful for analyzing two or more replicate data sets for a sample. Thus in a manner analogous to that described above in Example 2, replicate data sets or spectrum, $\{I_1(r,c)\}, \{I_2(r,c)\}, \ldots \{I_n(r,c)\}$, are readily analyzed.

Embodiments in accordance with the present invention also encompass equipment configured to perform the methods described herein. For example, in some embodiments of the present invention, the algorithms of such described methods are evaluated using a general purpose computer apparatus having program code effective to perform such an analysis. In other exemplary embodiments, evaluation of data employing methods in accordance with the present invention are performed using any of the one or more analytical instruments that can used to collect the data. For such latter embodiments, such analytical instruments can have program code, to effect evaluations of the algorithms "hard coded", alternately referred to as "firmware," or as software much in the same manner as the aforementioned general purpose computer apparatus ("hard coded" is understood to mean program code implemented through hardware, i.e. PROMS, or as part of the instrument's basic operating system functions in a manner analogous to the instrument's data measurement functions). Embodiments of the present invention also include computer encoded instructions required to effect methods of in accordance with the present invention on a general purpose computing apparatus as well as such instructions formulated for any of the specific instruments discussed herein. It will be understood, that such computer encoded instructions are within the scope and spirit of the present invention regardless of the manner in which such instructions are stored or provided to a device capable of using such instructions. Thus, for example, such instructions stored on portable storage media or fixed storage media as well as such instructions provided in "hard coded" form are within the scope and spirit of the present invention.

Where embodiments in accordance with the present invention encompass an analytical instrument for measuring a characteristic of a sample, generating indexed data therefrom and evaluating such indexed data, such instrument is typically configured having at least two measurement devices. Such measuring devices are employed to generate raw data, i.e. as described in Example 3, an intensity (number of photons) is provided from a first measuring device and a position or location is provided from a second measuring device. Once such raw data is provided, generally such an instrument will encompass a data management device configured to receive the raw data from the measurement devices and convert such raw data into a set of indexed data. While some embodiments will provide a separate module or device for such a management function, it will be understood that other embodiments will provide this function by using software code that is implemented in a computing device. Instrument embodiments of the present invention will also encompass an evaluation device configured to select a subset of indices from the indexed data and compute an intensity weighted measure of dispersion for the selected subset of indices using a subset of responses corresponding to the subset of indices and to compare such an intensity weighted measure of dispersion to a dispersion critical value. The dispersion critical value determined using an expected value of the intensity weighted measure of dispersion where a null hypothesis of no transient feature present is accepted. In addition, such embodiments of the present invention can include an apparatus or device for displaying and/or storing the results of the data evaluation. Such display and/or storage device(s) being any of the known devices used for such purposes.

While exemplary embodiments in accordance with the present invention are shown and described herein, it will be apparent to those skilled in the art that changes and/or modifications to such embodiments are possible without departing from the invention in its broader aspects. Thus, such changes and/or modifications that are a result of the teachings of the present invention are within the scope and spirit of the present invention. The appended claims are therefore intended to cover all such changes and modifications that are within the scope and spirit of such exemplary embodiments.

What is claimed is:

1. A method of identifying a feature in an indexed dataset, comprising:
   selecting an initial subset of indices, the initial subset of indices being encompassed by an initial window-of-interest and comprising at least one beginning index and at least one ending index;
   computing an intensity weighted measure of dispersion for the subset of indices using a subset of responses corresponding to the subset of indices; and
   comparing the intensity weighted measure of dispersion to a dispersion critical value determined from an expected value of the intensity weighted measure of dispersion under a null hypothesis of no transient feature present.

2. The method of claim 1, wherein the intensity weighted measure of dispersion is an intensity weighted variance.

3. The method of claim 1, wherein the beginning index and the ending index are advanced at least one index for computing a second intensity weighted measure of dispersion.

4. The method of claim 3, wherein the dispersion critical value exceeds a background level of dispersion.

5. The method of claim 4, wherein noise is identified as data corresponding to a first weighted measure above the dispersion critical value and a signal is identified as data corresponding to a second weighted measure below the dispersion critical value.

6. The method of claim 5, wherein the second weighted measure is a plurality of weighted measures having consecutive indices.

7. The method of claim 1 further comprising selecting, computing and comparing for at least two replicate data sets for a sample.

8. The method of claim 7, further comprising, obtaining an estimate of expected value and an estimate of uncertainty of the data from the at least two replicate data sets, for both the indices and the responses corresponding thereto.

9. The method of claim 8, further comprising displaying the estimate of expected value and the estimate of uncertainty together.

10. The method of claim 1, wherein the data from the indexed dataset is selected from the group consisting of spectral data, chromatographic data, time series data, and combinations thereof.

11. The method of claim 1, further comprising computing a weighted statistic of an index of the indexed dataset, the weighted statistic useful for characterizing the feature.

12. The method of claim 11, wherein the computing of the weighted statistic employs iteratively scanning the data, individual scans using a differently sized window-of-interest.

13. The method of claim 12, wherein three, five or seven scans are employed in iteratively scanning the data.

14. The method of claim 12, wherein a size of the initial window of interest is determined from the resolution of a measurement system used to generate the data.

15. The method of claim 1 further comprising reporting at least two replicate data sets, individual ones of the at least two replicate data sets having a subset of indices corresponding to a subset of responses, comprising:
   obtaining a first estimate of expected value and an second estimate of uncertainty of data, the first and second estimates being obtained from individual ones of the at least two replicate data sets and the first and second estimates being for both the indices and the responses of each replicate data set;
   displaying the expected value of each of the responses as a vertical bar located at an expected value of each of the indices; and
   displaying an uncertainty region centered at a top of the vertical bar.

16. The method of claim 1, wherein selecting the subset of indices further comprises:
   selecting another subset of indices, the another subset encompassed by the window-of-interest and having at least one beginning index and an at least one ending index;
   computing an intensity weighted variance (IWV) for at least one of the initial and another subset of indices using a subset of responses corresponding to each subset of indices; and
   comparing the IWV to a critical value determined from an expected value of IWV under a null hypothesis of no transient feature present.

17. The method of claim 16, further comprising:
   continuing to select subsets of indices encompassed by the window-of-interest and having at least one beginning index and an at least one ending index until essentially all of the subsets of indices encompassed by the window-of-interest are selected; and
   continuing to compute an intensity weighted variance (IWV) for the selected subset of indices using a subset of responses corresponding to individual ones of the subset of indices; and continuing to compare the IWV to a critical value determined from the expected value of IWV under a null hypothesis of no transient feature present.

18. The method of claim 1, wherein selecting a subset of indices further comprises:

selecting another subset of indices, the second subset encompassed by the window-of-interest and having at least one beginning index and an at least one ending index, computing an intensity weighted covariance (IWCV) for at least one of the first and second subset of indices using a subset of responses corresponding to individual ones of the subset of indices; and comparing the IWCV to a critical value determined from an expected value of IWCV under a null hypothesis of no transient feature present.

19. The method of claim 18, further comprising:

continuing to select subsets of indices encompassed by the window-of-interest and having at least one beginning index and an at least one ending index until essentially all of the subsets of indices encompassed by the window-of-interest are selected; and continuing to compute an intensity weighted covariance (IWCV) for the selected subset of indices using a subset of responses corresponding to individual ones of the subset of indices; and continuing to compare the IWCV to a critical value determined from the expected value of IWCV under a null hypothesis of no transient feature present.

20. A method of identifying a transient feature in a dataset comprising indexed data:

selecting at least one subset of indices, the at least one subset being encompassed by a window-of-interest, each subset having at least one beginning index and an at least one ending index;

computing at least one intensity weighted variance (IWV) for at least one of the at least one subset of indices using a subset of responses corresponding to the at least one subset of indices; or computing an intensity weighted covariance (IWCV) for at least one of the at least one subset of indices using a subset of responses corresponding to the at least one subset of indices; and comparing the IWV or the IWCV to a critical value determined from an expected value of IWV or IWCV under a null hypothesis of no transient feature present.

21. The method of claim 20 wherein computing the intensity weighted variance comprises computing the IWV employing the following relationship:

$$IWV = \frac{\sum_{j \leq N}(I_j(x_j - \bar{x}))^2}{\sum_{j \leq N} I_j},$$

where $x_j$ and $I_j$ are the index value and response, respectively, at index j, and N is the number of index values.

22. The method of claim 20 wherein computing an intensity weighted covariance comprises computing an expected value of the IWCV employing the following relationship:

$$E\{IWCV(\text{window})\} \approx \begin{pmatrix} S_x^2 & 0 \\ 0 & S_y^2 \end{pmatrix} = \begin{pmatrix} \Delta x^2 (N_x^2 - 1)/12 & 0 \\ 0 & \Delta y^2 (N_y^2 - 1)/12 \end{pmatrix},$$

where $S_x$ and $S_y$ are the theoretical IWV for a 1-D uniform distribution across indices x and y, respectively, and $N_x$ and $N_y$ are the number of index values.

23. An instrument for measuring a characteristic of a sample, generating indexed data therefrom and evaluating such indexed data, comprising:

a data management device configured to receive raw data from measurement devices and convert such raw data into a set of indexed data; and an evaluation device, the evaluation device configured to:
select a subset of indices from the indexed data, the subset of indices encompassed by a window-of-interest and having at least one beginning index and at least one ending index;
compute an intensity weighted measure of dispersion for the selected subset of indices using a subset of responses corresponding to the subset of indices; and
compare the intensity weighted measure of dispersion to a dispersion critical value which using an expected value of the intensity weighted measure of dispersion under the null hypothesis of no transient feature present.

24. The instrument of claim 23, wherein the instrument is configured to generate indexed data selected from the group consisting of spectral data, chromatographic data, time series data and combinations thereof.

25. The instrument of claim 23, wherein the instrument further comprises a program code storage device, the storage device configured to store program code comprising instructions for use within the evaluation device.

26. Computer storage media, comprising computer encoded instructions, such instructions being readable by a general purpose computer for selecting from indexed data, an initial subset of indices, the initial subset of indices being encompassed by an initial window-of-interest and comprising at least one beginning index and at least one ending index; computing an intensity weighted measure of dispersion for the subset of indices using a subset of responses corresponding to the subset of indices; and comparing the intensity weighted measure of dispersion to a dispersion critical value determined from an expected value of the intensity weighted measure of dispersion under a null hypothesis of no transient feature present.

* * * * *